(12) United States Patent
Lee (10) Patent No.: US 8,561,194 B2
(45) Date of Patent: Oct. 15, 2013

(54) MEMORY STORAGE DEVICE AND MEMORY CONTROLLER AND VIRUS SCANNING METHOD THEREOF

(75) Inventor: Chien-Fu Lee, Yunlin County (TW)

(73) Assignee: Phison Electronics Corp., Miaoli (TW)

( * ) Notice: Subject to any disclaimer, the term of this patent is extended or adjusted under 35 U.S.C. 154(b) by 212 days.

(21) Appl. No.: 13/109,011

(22) Filed: May 17, 2011

(65) Prior Publication Data

US 2012/0240230 A1     Sep. 20, 2012

(30) Foreign Application Priority Data

Mar. 15, 2011   (TW) .............................. 100108768 A (51) Int. Cl.
     *G06F 21/00*      (2013.01)

(52) U.S. Cl.
     USPC ................. 726/24; 726/22; 726/23; 709/224; 709/250

(58) Field of Classification Search
     USPC ..................................................... 726/22–24
     See application file for complete search history.

(56) References Cited

U.S. PATENT DOCUMENTS

| | | | |
|---|---|---|---|
| 7,761,605 B1* | 7/2010 | Rothwell et al. | 709/250 |
| 2004/0158741 A1* | 8/2004 | Schneider | 713/201 |
| 2006/0021041 A1* | 1/2006 | Challener et al. | 726/24 |
| 2009/0049552 A1* | 2/2009 | Williamson et al. | 726/24 |
| 2009/0133125 A1* | 5/2009 | Choi et al. | 726/24 |
| 2010/0306848 A1* | 12/2010 | Gellerich | 726/24 |
| 2010/0306849 A1* | 12/2010 | Zheng et al. | 726/24 |

OTHER PUBLICATIONS

Garfinkel et al., "A Virtual Machine Introspection Based Architecture for Intrusion Detection"; Jul. 2003, computer science Dept, Stanford University.*

* cited by examiner

*Primary Examiner* — Morshed Mehedi
*Assistant Examiner* — Jason Lee
(74) *Attorney, Agent, or Firm* — Jianq Chyun IP Office (57) ABSTRACT

A memory storage device, a memory controller, and a virus scanning method are provided. In the method, a virus signature database recording a predetermined file segment and a corresponding virus signature is provided. A plurality of logical addresses is mapped to a part of a plurality of physical addresses in a rewritable non-volatile memory chip of the memory storage device, a host system accesses the logical addresses by using a file system including a file allocation table (FAT). At lease one binary code is received. The FAT is analyzed to identify a file segment containing the at least one binary code. If the file segment matches the predetermined file segment, the at least one binary code is not written into the memory storage device or transmitted back to the host system when the at least one binary code matches the virus signature corresponding to the predetermined file segment.

24 Claims, 8 Drawing Sheets

MEMORY STORAGE DEVICE AND MEMORY CONTROLLER AND VIRUS SCANNING METHOD THEREOF

CROSS-REFERENCE TO RELATED APPLICATION

This application claims the priority benefit of Taiwan application serial no. 100108768, filed Mar. 15, 2011. The entirety of the above-mentioned patent application is hereby incorporated by reference herein and made a part of this specification.

BACKGROUND

1. Technology Field

The invention generally relates to a virus scanning method, and more particularly, to a virus scanning method automatically executed by a memory storage device, the memory storage device, and a memory controller.

2. Description of Related Art

Flash memory is one of the most adaptable storage media to electronic devices due to its characteristics such as data non-volatility, low power consumption, small volume, and non-mechanical structure. Many existing portable storage devices (for example, memory cards or flash drives) use flash memories as their storage media.

After a portable storage device is connected to a host system, a user can write data into the portable storage device or read data stored in the portable storage device via the host system. However, if the host system is connected to a malicious website at the same time, the host system will be infected by malware and may pass infected files into the portable storage device. On the other hand, a host system will be attacked by computer viruses if an infected portable storage device is connected to the host system.

In order to avoid the situations described above, a user usually installs antivirus software in his/her host system to scan for any virus. However, an existing portable storage device can only be scanned by a host system after it is connected to the host system since the portable storage device itself does not come with any virus scanning capability.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a virus scanning method, a memory controller, and a memory storage device, wherein the memory storage device comes with a virus scanning capability.

The invention provides a virus scanning method adapted to a memory storage device coupled to a host system. The memory storage device includes a rewritable non-volatile memory chip. The rewritable non-volatile memory chip has a plurality of physical blocks, and each of the physical blocks has a plurality of physical addresses. In the virus scanning method, a virus signature database is provided, wherein the virus signature database records at least one predetermined file segment and at least one virus signature corresponding to the at least one predetermined file segment. A plurality of logical addresses is configured to be mapped to a part of the physical addresses, wherein the host system accesses the logical addresses by using a file system, and the file system includes a file allocation table (FAT). At least one binary code is received, wherein the at least one binary code is a binary code to be written or read by the host system. The FAT is analyzed to identify a file segment containing the at least one binary code and determining whether the file segment matches any one of the at least one predetermined file segment. If the file segment matches one of the at least one predetermined file segment, whether the at least one binary code matches the at least one virus signature corresponding to the matched predetermined file segment is determined. If the at least one binary code matches one of the at least one virus signature corresponding to the matched predetermined file segment, the at least one binary code is not written into the memory storage device or transmitted back to the host system.

The invention also provides a memory controller for managing a rewritable non-volatile memory chip in a memory storage device. The memory controller includes a host system interface, a memory interface, and a memory management circuit. The host system interface is configured to couple a host system. The memory interface is configured to couple the rewritable non-volatile memory chip, wherein the rewritable non-volatile memory chip has a plurality of physical blocks, and each of the physical blocks has a plurality of physical addresses. The memory management circuit is coupled to the host system interface and the memory interface. The memory management circuit provides a virus signature database, wherein the virus signature database records at least one predetermined file segment and at least one virus signature corresponding to the at least one predetermined file segment. The memory management circuit further configures a plurality of logical addresses to be mapped to a part of the physical addresses, wherein the host system accesses the logical addresses by using a file system, and the file system includes a FAT. When the memory management circuit receives at least one binary code, the memory management circuit further analyzes the FAT to identify a file segment containing the at least one binary code, wherein the at least one binary code is a binary code to be written or read by the host system. The memory management circuit further determines whether the file segment matches any one of the at least one predetermined file segment. If the file segment matches one of the at least one predetermined file segment, the memory management circuit determines whether the at least one binary code matches the at least one virus signature corresponding to the matched predetermined file segment. If the at least one binary code matches one of the at least one virus signature corresponding to the matched predetermined file segment, the memory management circuit does not write the at least one binary code into the memory storage device or transmit the binary code back to the host system.

The invention further provides a memory storage device including a rewritable non-volatile memory chip, a connector, and a memory controller. The rewritable non-volatile memory chip has a plurality of physical blocks, and each of the physical blocks has a plurality of physical addresses. The connector is configured to couple a host system. The memory controller is coupled to the rewritable non-volatile memory chip and the connector. The memory controller provides a virus signature database, wherein the virus signature database records at least one predetermined file segment and at least one virus signature corresponding to the at least one predetermined file segment. The memory controller further configures a plurality of logical addresses to be mapped to a part of the physical addresses, wherein the host system accesses the logical addresses by using a file system, and the file system includes a FAT. When the memory controller receives at least one binary code, the memory controller further analyzes the FAT to identify a file segment containing the at least one binary code, wherein the at least one binary code is a binary code to be written or read by the host system. The memory controller further determines whether the file segment matches any one of the predetermined file segment. If the file segment matches one of the at least one predetermined file segment, the memory controller determines whether the at least one binary code matches the at least one virus signature corresponding to the matched predetermined file segment. If the memory controller determines that the at least one binary code matches one of the at least one virus signature corresponding to the matched predetermined file segment, the memory controller does not write the at least one binary code into the memory storage device or transmit the at least one binary code back to the host system.

As described above, in the invention, when a host system is about to read or write a binary code, a FAT is analyzed to determined a file segment containing the binary code, and possible virus signatures are compared regarding the file segment, so that a virus scanning purpose is achieved.

These and other exemplary embodiments, features, aspects, and advantages of the invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a memory chip and a controller (also referred to as a control circuit). A memory storage device is usually used along with a host system so that the host system can write data into or read data from the memory storage device. In addition, a memory storage device may also include an embedded memory and a software that can be executed in the host system and substantially served as a controller of the embedded memory.

Figure 1A:
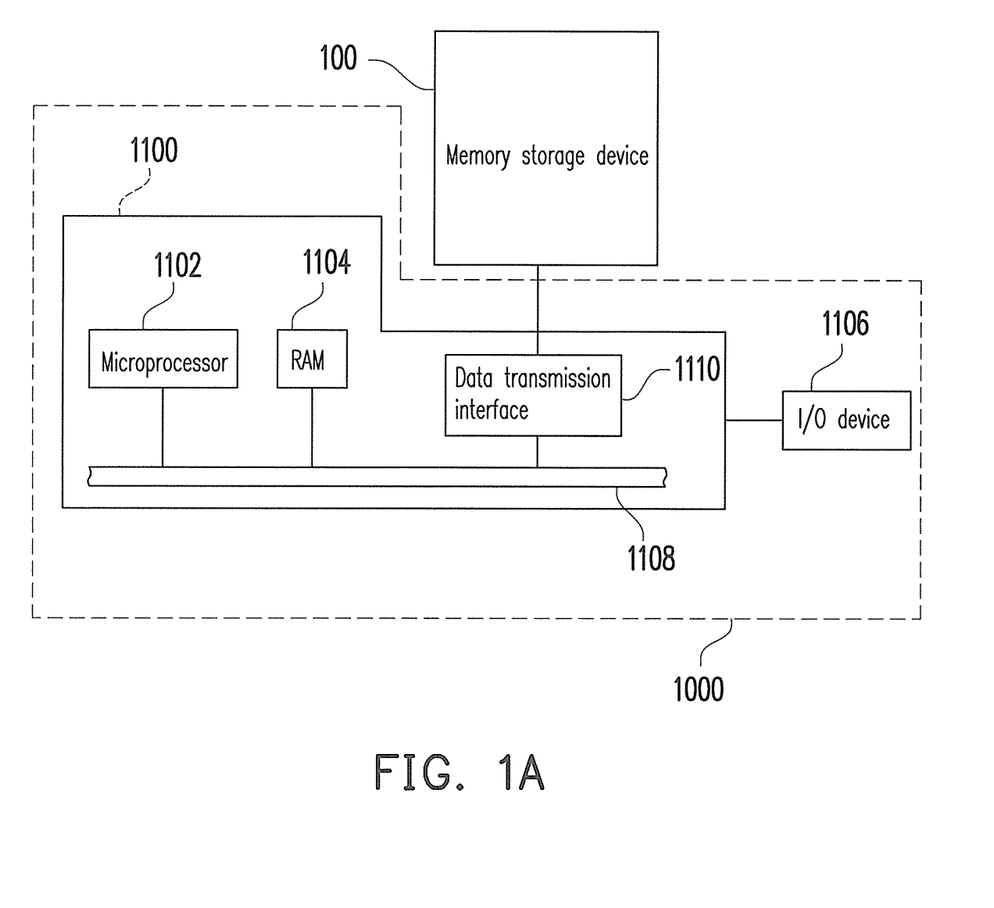
FIG. 1A is a diagram of a host system and a memory storage device according to an exemplary embodiment of the invention.

FIG. 1A is a diagram of a host system and a memory storage device according to an exemplary embodiment of the invention.

Figure 1B:
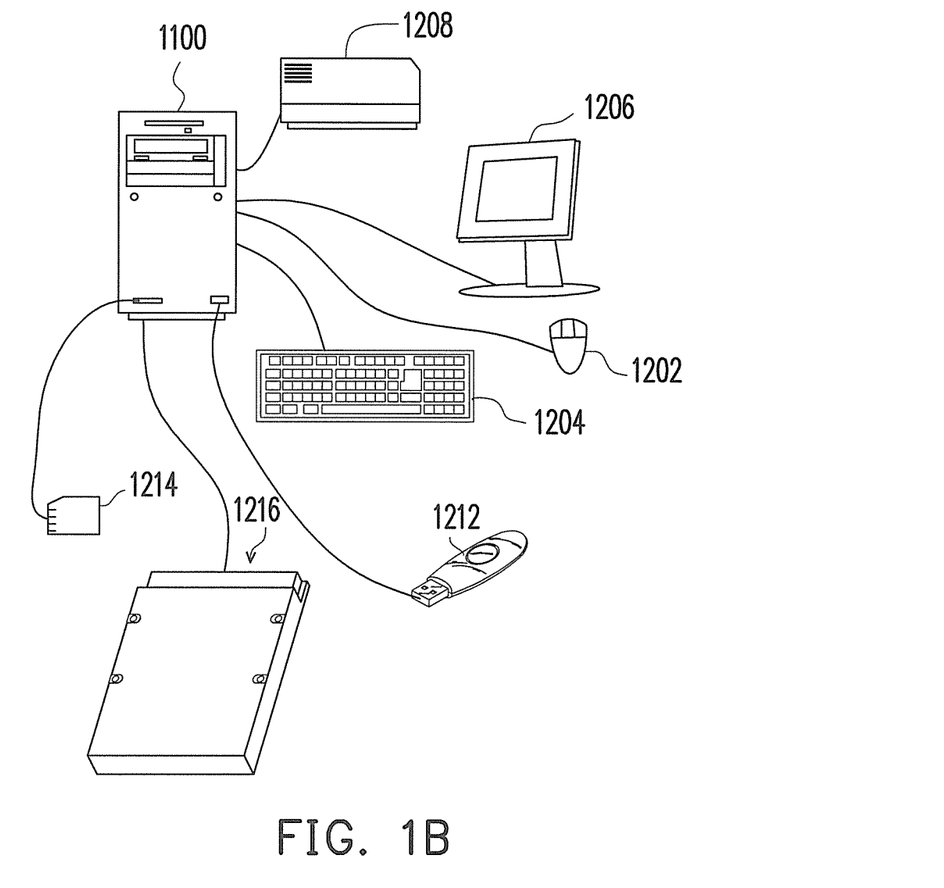
FIG. 1B is a diagram of a computer, an input/output (I/O) device, and a memory storage device according to an exemplary embodiment of the invention.

The host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understand that the I/O device 1106 is not limited to the devices illustrated in FIG. 1B and which may further include other devices.

In an exemplary embodiment of the invention, a memory storage device 100 is coupled to other components of the host system 1000 through the data transmission interface 1110. The host system 1000 can write data into or read data from the memory storage device 100 through the operations of the microprocessor 1102, the RAM 1104, and the I/O device 1106. The memory storage device 100 may be a memory card 1214, a flash drive 1212, or a solid state drive (SSD) 1216, as shown in FIG. 1B.

Figure 1C:
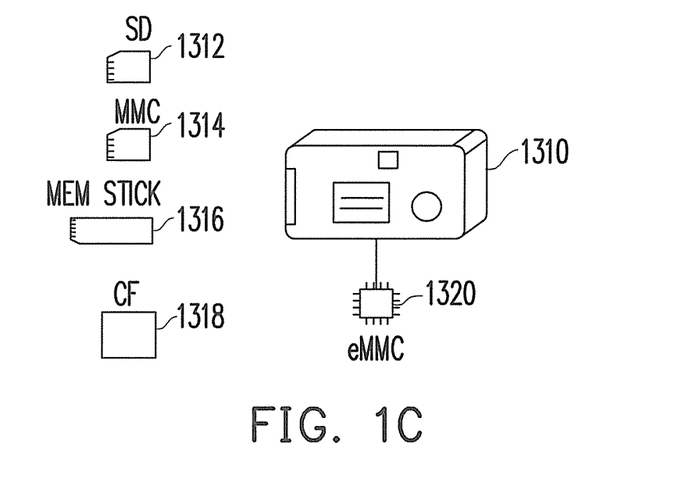
FIG. 1C is a diagram of a host system and a memory storage device according to another exemplary embodiment of the invention.

Generally speaking, the host system 1000 may be any system that can store data. Even though the host system 1000 is described as a computer system in the present exemplary embodiment, in another exemplary embodiment of the invention, the host system 1000 may also be a cell phone, a digital camera, a video camera, a communication device, an audio player, or a video player. For example, if the host system is a digital camera 1310, the memory storage device is a secure digital (SD) card 1312, a multimedia card (MMC) 1314, a memory stick (MS) 1316, a compact flash (CF) card 1318, or an embedded storage device 1320 (as shown in FIG. 1C) used along with the digital camera 1310. The embedded storage device 1320 includes an embedded MMC (eMMC). It should be mentioned that the eMMC is directly coupled to the motherboard of the host system.

Figure 2:
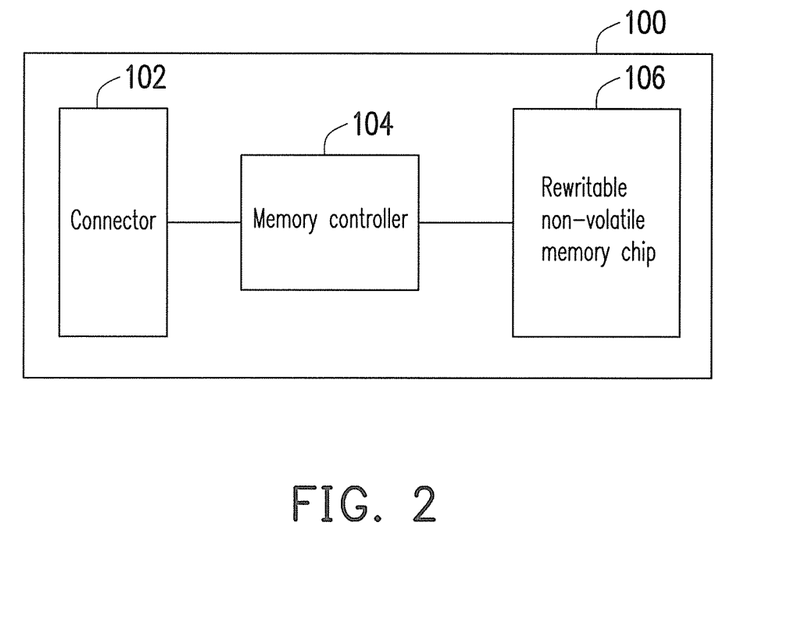
FIG. 2 is a schematic block diagram of the memory storage device in FIG. 1A.

FIG. 2 is a schematic block diagram of the memory storage device 100 in FIG. 1A. Referring to FIG. 2, the memory storage device 100 includes a connector 102, a memory controller 104, and a rewritable non-volatile memory chip 106.

The connector 102 is coupled to the memory controller 104 and configured to couple the host system 1000. In the present exemplary embodiment, the connector 102 is a universal serial bus (USB) interface. However, the invention is not limited thereto, and in other exemplary embodiments, the connector 102 may also be a serial advanced technology attachment (SATA) interface, a MMC interface, a parallel advanced technology attachment (PATA) interface, an Institute of Electrical and Electronic Engineers (IEEE) 1394 interface, a peripheral component interconnect (PCI) express interface, a SD interface, a MS interface, a CF interface, an integrated drive electronics (IDE) interface, or any other suitable interface.

The memory controller 104 executes a plurality of logic gates or control instructions implemented in a hardware form or a firmware form and performs various data operations on the rewritable non-volatile memory chip 106 according to commands of the host system 1000. Particularly, the memory controller 104 enables the memory storage device 100 to perform virus scanning on files through the virus scanning method provided by the present exemplary embodiment. The virus scanning method in the present exemplary embodiment will be described below with reference to accompanying drawings.

The rewritable non-volatile memory chip 106 is coupled to the memory controller 104. The rewritable non-volatile memory chip 106 stores file system information (for example, a file allocation table (FAT) or a new technology file system (NTFS)) and general data (for example, text files, video files and audio files, etc). The rewritable non-volatile memory chip 106 may be a multi level cell (MLC) NAND flash memory chip. However, the invention is not limited thereto, and the rewritable non-volatile memory chip 106 may also be a single level cell (SLC) NAND flash memory chip, any other flash memory chip, or any memory chip with the same characteristics.

Figure 3:
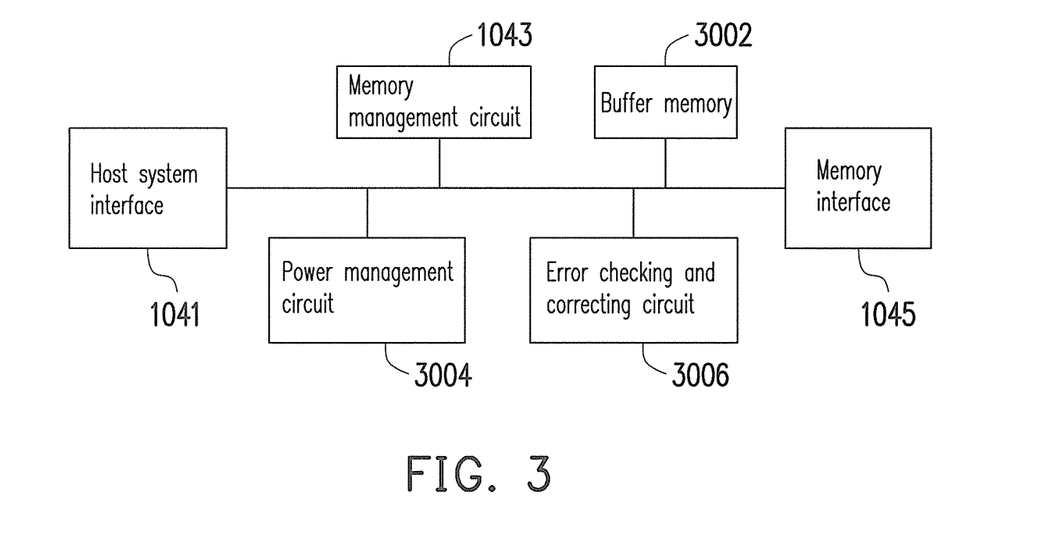
FIG. 3 is a schematic block diagram of a memory controller according to an exemplary embodiment of the invention.

FIG. 3 is a schematic block diagram of a memory controller according to an exemplary embodiment of the invention. Referring to FIG. 3, the memory controller 104 includes a host system interface 1041, a memory management circuit 1043, and a memory interface 1045.

The host system interface 1041 is coupled to the memory management circuit 1043 and configured to couple the host system 1000 through the connector 102. The host system interface 1041 receives and identifies commands and data from the host system 1000. Namely, commands and data sent by the host system 1000 are transmitted to the memory management circuit 1043 through the host system interface 1041. In the present exemplary embodiment, the host system interface 1041 is, corresponding to the connector 102, a USB interface. However, in other exemplary embodiments, the host system interface 1041 may also be a SATA interface, a MMC interface, a PATA interface, an IEEE 1394 interface, a PCI express interface, a SD interface, a MS interface, a CF interface, an IDE interface, or an interface conforming to any other interface standard.

The memory management circuit 1043 controls the overall operation of the memory controller 104. To be specific, the memory management circuit 1043 has a plurality of control instructions, and when the memory storage device 100 is in operation, the control instructions are executed to accomplish the virus scanning method in the present exemplary embodiment.

In an exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to accomplish the virus scanning method in the present exemplary embodiment.

In another exemplary embodiment of the invention, the control instructions of the memory management circuit 1043 may also be stored into a specific area of the rewritable non-volatile memory chip 106 (for example, a system area in the rewritable non-volatile memory chip 106 that is exclusively used for storing system data) as program codes. In addition, the memory management circuit 1043 has a microprocessor unit (not shown), a ROM (not shown), and a RAM (not shown). In particular, the ROM has a driving code, and when the memory controller 104 is enabled, the microprocessor unit first executes the driving code to load the control instructions from the rewritable non-volatile memory chip 106 into the RAM of the memory management circuit 1043. Thereafter, the microprocessor unit runs the control instructions to execute the virus scanning method in the present exemplary embodiment. Additionally, in another exemplary embodiment of the invention, the control instructions of the memory management circuit 1043 may also be implemented in a hardware form.

The memory interface 1045 is coupled to the memory management circuit 1043 so that the memory controller 104 and the rewritable non-volatile memory chip 106 are coupled with each other. Accordingly, the memory controller 104 can perform related operations on the rewritable non-volatile memory chip 106. Namely, data to be written into the rewritable non-volatile memory chip 106 is converted by the memory interface 1045 into a format acceptable to the rewritable non-volatile memory chip 106.

In an exemplary embodiment of the invention, the memory controller 104 further includes a buffer memory 3002. The buffer memory 3002 may be a static random access memory (SRAM) or a dynamic random access memory (DRAM). However, the invention is not limited thereto. The buffer memory 3002 is coupled to the memory management circuit 1043 for temporarily storing data from the host system 1000 or the rewritable non-volatile memory chip 106.

In another exemplary embodiment of the invention, the memory controller 104 further includes a power management circuit 3004. The power management circuit 3004 is coupled to the memory management circuit 1043 and configured to control the power supply of the memory storage device 100.

In yet another exemplary embodiment of the invention, the memory controller 104 further includes an error checking and correcting (ECC) circuit 3006. The ECC circuit 3006 is coupled to the memory management circuit 1043 and configured to execute an ECC procedure to ensure data accuracy. To be specific, when the memory management circuit 1043 receives a write command from the host system 1000, the ECC circuit 3006 generates a corresponding ECC code for the data corresponding to the write command, and the memory management circuit 1043 writes the data corresponding to the write command and the corresponding ECC code into the rewritable non-volatile memory chip 106. Subsequently, when the memory management circuit 1043 reads data from the rewritable non-volatile memory chip 106, it also reads the ECC code corresponding to the data, and ECC circuit 3006 executes the ECC procedure on the data according to the ECC code.

Figure 4A:
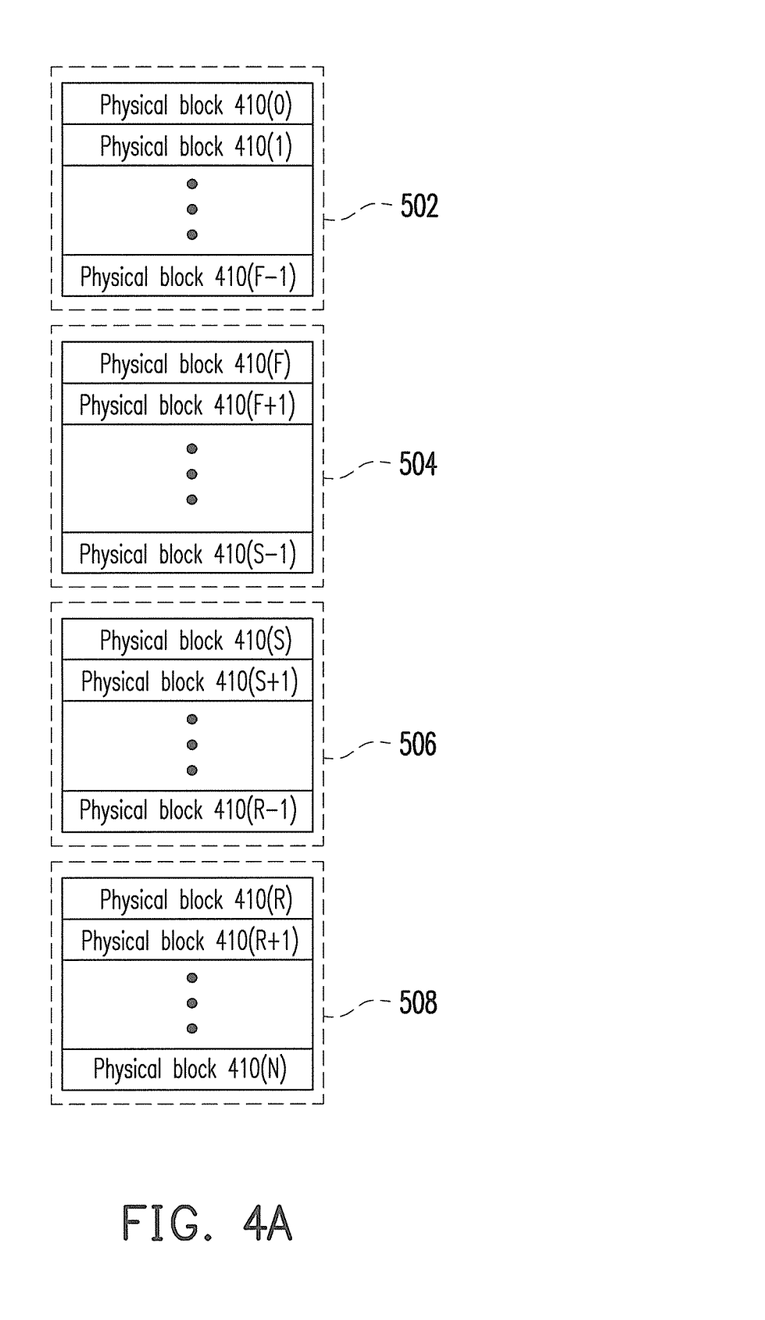
FIG. 4A and FIG. 4B are diagrams illustrating how physical blocks are managed according to an exemplary embodiment of the invention.
Figure 4B:
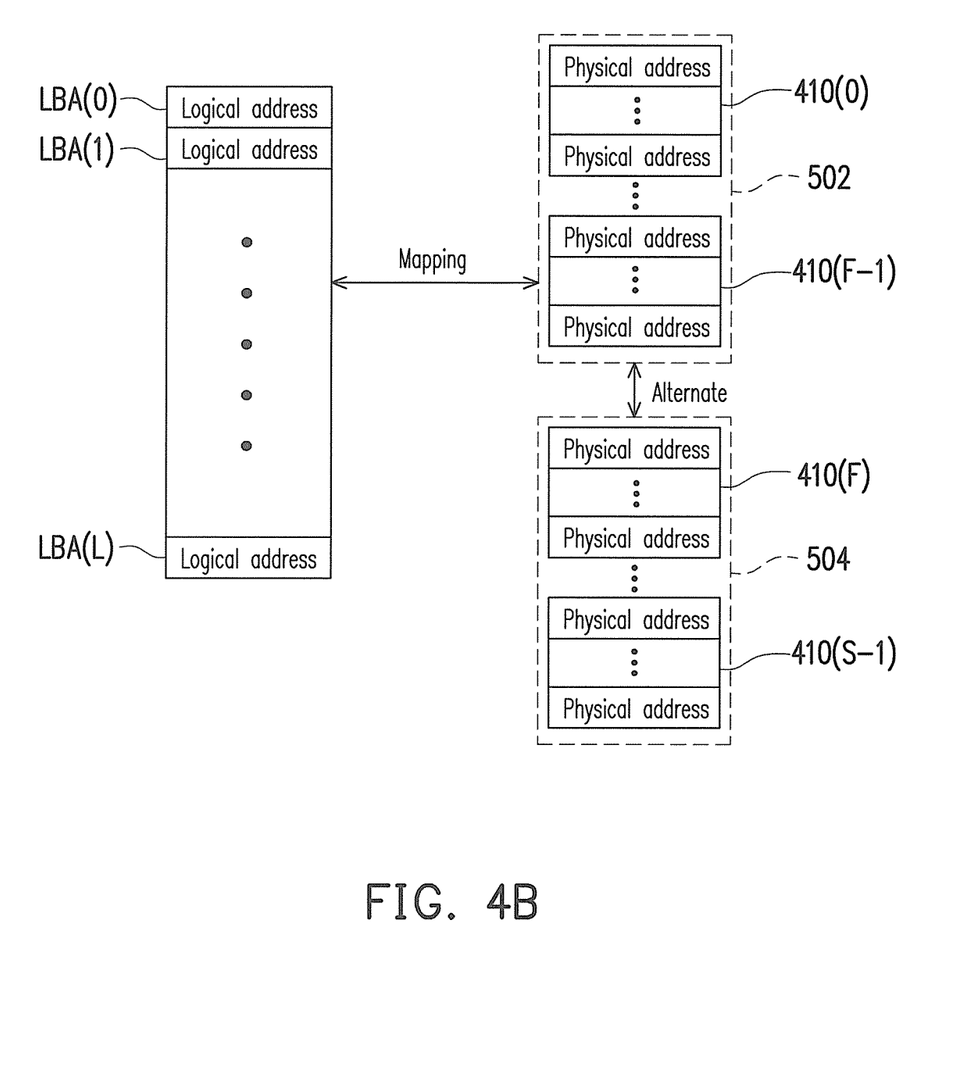

FIG. 4A and FIG. 4B are diagrams illustrating how physical blocks are managed according to an exemplary embodiment of the invention.

Referring to FIG. 4A, the rewritable non-volatile memory chip 106 includes physical blocks 410(0)-410(N), wherein each of the physical blocks includes a plurality of physical addresses. The memory management circuit 1043 in the memory controller 104 logically groups the physical blocks 410(0)-410(N) into a data area 502, a spare area 504, a system area 506, and a replacement area 508. The symbols F, S, R, and N in FIG. 4A are positive integers, and which respectively represent the numbers of physical blocks in foregoing areas and can be determined by the manufacturer of the memory storage device 100 according to the capacity of the rewritable non-volatile memory chip 106.

The physical blocks logically belonging to the data area 502 and the spare area 504 are used for storing data from the host system 1000. To be specific, the physical blocks in the data area 502 are considered physical blocks containing data, while the physical blocks in the spare area 504 are used for substituting the physical blocks in the data area 502. In other words, the physical blocks in the spare area 504 are either blank or usable physical blocks (no data is recorded therein or data recorded therein is already marked as invalid data). When a write command and the data to be written are received from the host system 1000, the memory management circuit 1043 selects a physical block from the spare area 504 and writes the data into the selected physical block, so as to substitute a physical block in the data area 502.

The physical blocks logically belonging to the system area 506 are used for recording system data. For example, the system data includes the manufacturer and model of the rewritable non-volatile memory chip 106, the number of physical blocks in the rewritable non-volatile memory chip 106, the number of physical addresses in each physical block, and a logical address-physical address mapping table, etc.

The physical blocks logically belonging to the replacement area 508 are used for replacing damaged physical blocks in the data area 502, the spare area 504, and the system area 506. To be specific, if there are still normal physical blocks in the replacement area 508 and a physical block in the data area 502 is damaged, the memory management circuit 1043 selects a normal physical block from the replacement area 508 to replace the damaged physical block in the data area 502.

In order to allow the host system 1000 to access the rewritable non-volatile memory chip 106, referring to FIG. 4B, in the present exemplary embodiment, the memory management circuit 1043 configures a plurality of logical addresses LBA(0)-LBA(L) to be mapped to the physical addresses of the physical blocks 410(0)-410(F−1) in the data area 502. The memory management circuit 1043 provides the logical addresses LBA(0)-LBA(L) to the host system 1000 and records the mapping relationship between the logical addresses LBA(0)-LBA(L) and the physical addresses in the data area 502 in a logical address-physical address mapping table. Thus, when the host system 1000 is about to read a specific logical address, the memory management circuit 1043 reads the data from the corresponding physical address according to the logical address-physical address mapping table.

In the present exemplary embodiment, when the memory storage device 100 is coupled to the host system 1000 for the first time and is initialized, the host system 1000 formats the logical addresses LBA(0)-LBA(L) of the memory storage device 100 by using a file system. Below, the memory storage device 100 formatted with the FAT file system will be described with reference to FIG. 5. However, in other exemplary embodiments of the invention, the memory storage device 100 may also be formatted by using the NTFS file system or any other file system.

Figure 5:
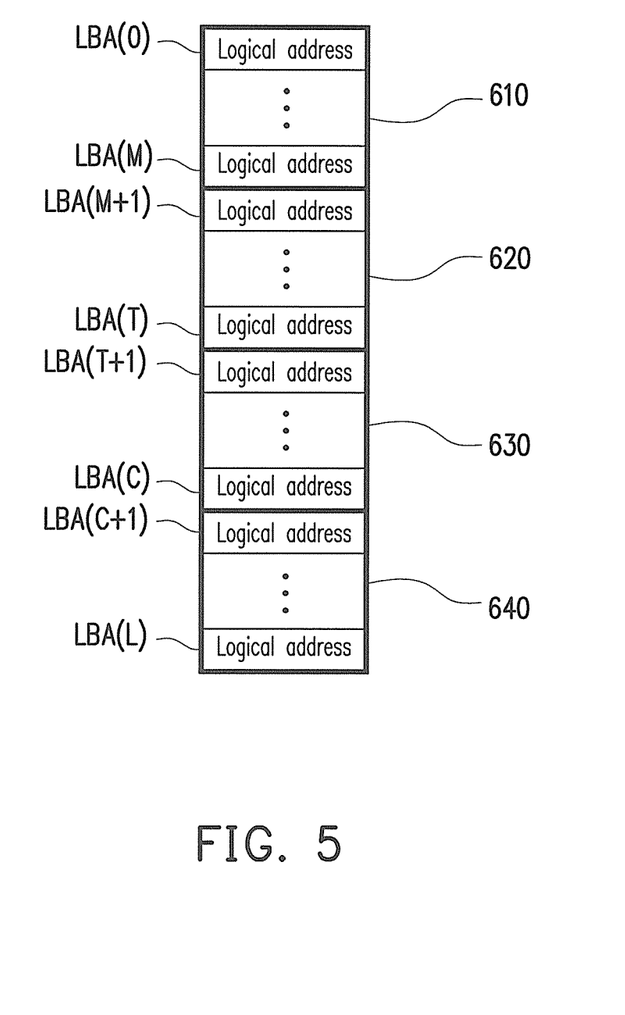
FIG. 5 illustrates an example of formatting a memory storage device with a file allocation table (FAT) file system according to an exemplary embodiment of the invention.

Referring to FIG. 5, in the present exemplary embodiment, the host system 1000 formats the memory storage device 100 into a partition by using the FAT file system, and the logical addresses LBA(0)-LBA(L) are sequentially grouped into a master boot record (MBR) area 610, a FAT area 620, a directory area 630, and a file area 640, wherein M, T, C, and L are positive integers and respectively represent the numbers of logical addresses in foregoing areas.

The logical addresses LBA(0)-LBA(M) belonging to the MBR area 610 are used for storing system information about the available storage space of the memory storage device 100, such as a MBR.

The logical addresses LBA(M+1)-LBA(T) belonging to the FAT area 620 are used for storing the FAT. The FAT includes a logical address index field and a link value field for recording a link value corresponding to each logical address. In an exemplary embodiment, the FAT area 620 stores two FATs, wherein one of the FATs is normally accessed while the other one is a backup FAT.

The logical addresses LBA(T+1)-LBA(C) belonging to the directory area 630 are used for storing the root directory. The root directory records file description information of existing files in the rewritable non-volatile memory chip 106, such as the file name of an existing file and the file start logical address for storing the existing file. The logical addresses LBA(C+1)-LBA(L) belonging to the file area 640 are used for actually storing contents of existing files.

In the present exemplary embodiment, when the host system 1000 issues a read command, the memory controller 104 scans the data to be read by the read command according to a virus signature database to determine whether the data is infected by any virus before the memory controller 104 sends the data back to the host system 1000 (or when the host system 1000 issues a write command, before the memory controller 104 writes the data corresponding to the write command into the memory storage device 100). However, the memory controller 104 does not compare the data with all the virus signatures recorded in the virus signature database. Instead, the memory controller 104 first identifies the file and file segment containing the data and then compares the data with relevant virus signatures according to the file segment.

Generally speaking, a file infector virus will be written into a specific segment (for example, an anterior, middle, or posterior segment) of a file, and a representative binary code can be captured from each virus and used for recognizing the virus during a virus scanning process. Such a unique binary code is also referred to as a virus signature. Since the segment corresponding to an existing virus signature is already known, in the present exemplary embodiment, the virus signature database records at least one predetermined file segment and at least one virus signature corresponding to the predetermined file segment. For example, if the predetermined file segments recorded in the virus signature database are the anterior segment, middle segment, and posterior segment of a file, the virus signature database then records one or more virus signatures respectively corresponding to the anterior segment, the middle segment, and the posterior segment of the file.

Because only a logical address range to be accessed by the host system 1000 but not the file segment containing the data to be read or written by the host system 1000 can be identified according to a write or read command from the host system 1000, the memory management circuit 1043 in the memory controller 104 analyzes the FAT in the FAT area 620 to identify the file and file segment containing the data.

Taking a write command as an example, it is assumed that the write command issued by the host system 1000 is about to write data into an access address range, wherein the access address range is determined by the cache memory of the operating system (OS) in the host system 1000 (for example, the cache memory of the Microsoft Windows operating system has a capacity of 64 kilobytes). After the memory management circuit 1043 receives the data (containing at least one binary code) corresponding to the write command and before it writes the binary code into the rewritable non-volatile memory chip 106, the memory management circuit 1043 first changes the FAT according to the access address range and then determines a logical address linked list corresponding to the file containing the binary code according to the changed FAT. Thereby, the memory management circuit 1043 can identify the file segment containing the binary code to be written by the host system 1000 according to the position of the access address range in the logical address linked list.

When the host system 1000 issues a read command (herein it is assumed that the read command is about to read an access address range), the memory management circuit 1043 compares the start address of the access address range with the file start logical address of each existing file recorded in the root directory in the directory area 630 and then determines the file containing the binary code to be read by the host system 1000 and the file start logical address of the file. After that, the memory management circuit 1043 finds the next logical address after the file start logical address for storing the file according to the file start logical address and the FAT. By the same way, the memory management circuit 1043 determines the logical addresses (referred to as a logical address linked list) for sequentially storing the file containing the binary code to be read by the host system 1000 by analyzing the FAT. The memory management circuit 1043 identifies the file segment containing the binary code to be read by the host system 1000 according to the position of the access address range in the logical address linked list.

After identifying the file segment containing the binary code to be written or read by the host system 1000, the memory management circuit 1043 determines whether the file segment matches any predetermined file segment recorded in the virus signature database. For example, assuming that the predetermined file segments recorded in the virus signature database are the anterior segment, the middle segment, and the posterior segment of a file, the memory management circuit 1043 determines whether the file segment containing the binary code is an anterior segment, a middle segment, or a posterior segment. However, foregoing file segmentation is only an example for describing the present embodiment but not intended to limit the scope of the invention.

If the file segment matches a predetermined file segment, the memory management circuit 1043 determines whether the binary code matches the virus signature corresponding to the predetermined file segment. For example, if the binary code is in the anterior segment of the corresponding file, the memory management circuit 1043 finds all the virus signatures corresponding to the anterior segment of a file from the virus signature database and compares the binary code with each of the virus signatures. If the binary code matches one of the virus signatures, it is determined that the binary code is virus-infected. Accordingly, the memory management circuit 1043 does not write the binary code into the memory storage device 100 or transmit the binary code back to the host system 1000.

However, if the file segment containing the binary code does not match any predetermined file segment, the memory management circuit 1043 splits the file segment into a plurality of sub file segments matching the predetermined file segments and then performs the comparison process. For example, when the current binary code to be written or read is an entire file, the memory management circuit 1043 splits the entire file into an anterior segment, a middle segment, and a posterior segment and determines whether the binary code in the anterior segment of the file matches the virus signature corresponding to the anterior segment in the virus signature database. If the binary code in the anterior segment of the file matches the virus signature corresponding to the anterior segment in the virus signature database, the memory management circuit 1043 does not write the binary code in the anterior segment of the file into the memory storage device 100 or transmit it back to the host system 1000. The memory management circuit 1043 respectively processes the binary codes in the middle segment and the posterior segment of the file by the same way to determine whether to write these binary codes into the memory storage device 100 or transmit them back to the host system 1000.

When the memory storage device 100 is in operation, the memory management circuit 1043 transmits a binary code received from the rewritable non-volatile memory chip 106 back to the host system 1000 in response to a read command issued by the host system 1000 and writes a binary code received from the host system 1000 into the rewritable non-volatile memory chip 106 in response to a write command issued by the host system 1000. Because the binary code to be written or read by each command may not be an entire file but a section of a file, the memory management circuit 1043 can instantly determine whether the binary code is virus-infected by simply determining the segment of the file in which the current binary code to be read or written by the host system 1000 is located and then comparing the binary code with the virus signature corresponding to the file segment.

Figure 6:
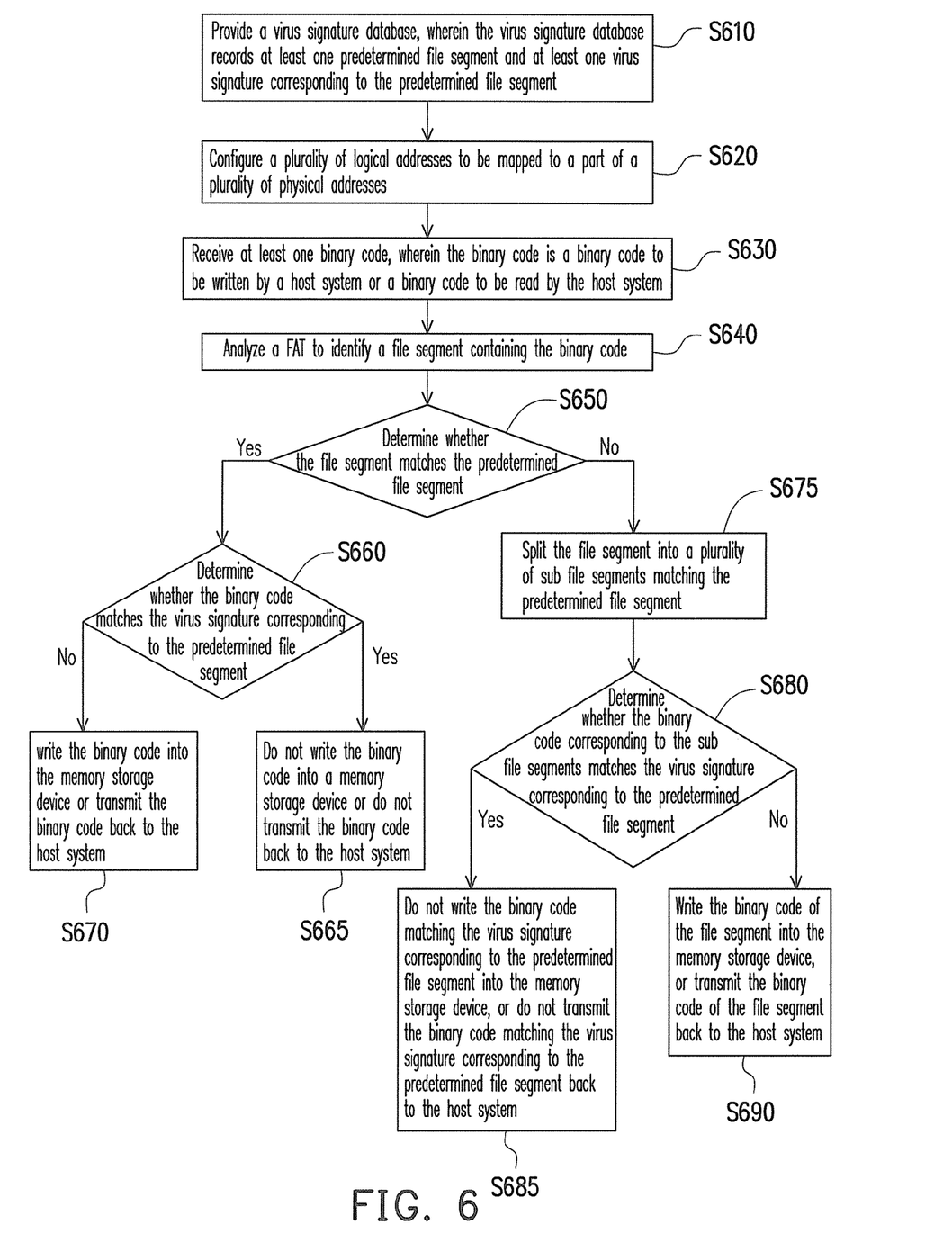
FIG. 6 is a flowchart of a virus scanning method according to an exemplary embodiment of the invention.

FIG. 6 is a flowchart of a virus scanning method according to an exemplary embodiment of the invention. Referring to FIG. 6, first, in step S610, the memory management circuit 1043 provides a virus signature database, wherein the virus signature database records at least one predetermined file segment and at least one virus signature corresponding to the predetermined file segment.

In step S620, the memory management circuit 1043 configures a plurality of logical addresses to be mapped to the physical addresses of a part of the physical blocks in the rewritable non-volatile memory chip 106.

In step S630, the memory management circuit 1043 receives at least one binary code, wherein the binary code may be a binary code to be written by the host system 1000 or a binary code to be read by the host system 1000. After that, in step S640, the memory management circuit 1043 analyzes the FAT to identify the file segment containing the binary code.

Next, in step S650, the memory management circuit 1043 determines whether the file segment matches any predetermined file segment in the virus signature database.

If the file segment matches a predetermined file segment, in step S660, the memory management circuit 1043 determines whether the binary code matches any virus signature corresponding to the predetermined file segment. If the binary code matches a virus signature corresponding to the predetermined file segment, in step S665, the memory management circuit 1043 does not write the binary code into the memory storage device 100 or transmit the binary code back to the host system 1000. Contrarily, if the binary code does not match any virus signature corresponding to the predetermined file segment, in step S670, the memory management circuit 1043 writes the binary code into the memory storage device 100 or transmits the binary code back to the host system 1000.

If the file segment does not match any predetermined file segment, in step S675, the memory management circuit 1043 splits the file segment into a plurality of sub file segments matching the predetermined file segments, and in step S680, the memory management circuit 1043 determines whether the binary code corresponding to the sub file segments matches the virus signature corresponding to the predetermined file segment. If the binary code corresponding to the sub file segments matches the virus signature corresponding to the predetermined file segment, in step S685, the memory management circuit 1043 does not write the binary code matching the virus signature corresponding to the predetermined file segment into the memory storage device 100 or transmit the binary code matching the virus signature corresponding to the predetermined file segment back to the host system 1000. If the binary code corresponding to the sub file segments does not match the virus signature corresponding to the predetermined file segment, in step S690, the memory management circuit 1043 writes the binary code of the file segment into the memory storage device 100 or transmits the binary code of the file segment back to the host system 1000.

In an exemplary embodiment of the invention, a light emitting device (for example, a light emitting diode (LED) lamp) is disposed in the memory storage device 100. After determining that the binary code to be read or written by the host system 1000 matches the virus signature corresponding to the predetermined file segment, the memory management circuit 1043 temporarily stops the operation of transmitting or writing the binary code and activates the light emitting device (for example, controls the light emitting device to flash) to inform a user that the binary code to be read or written is infected by virus.

Figure 7:
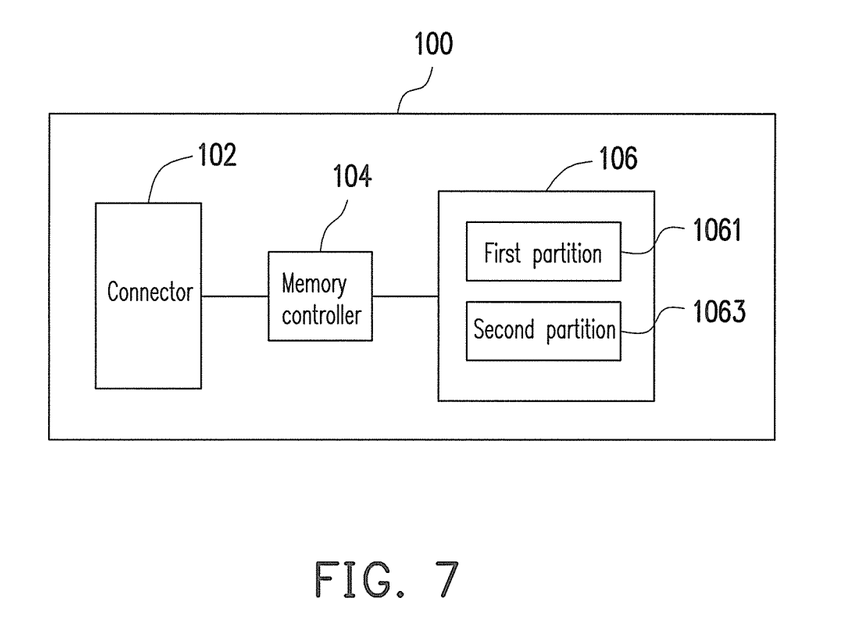
FIG. 7 is a schematic block diagram of a memory storage device according to another exemplary embodiment of the invention.

FIG. 7 is a schematic block diagram of a memory storage device according to another exemplary embodiment of the invention. In the present exemplary embodiment, the manufacturer of the memory storage device 100 logically divides the rewritable non-volatile memory chip 106 into a first partition 1061 and a second partition 1063 which is read-only and hidden, and records an auto-execute file and an application program in the second partition 1063 before the memory storage device 100 is manufactured.

The second partition 1063 is used for simulating a read-only CD-ROM. Since the second partition 1063 is a hidden partition, the OS of the host system 1000 can only recognize the first partition 1061 in general operation modes. Namely, the logical addresses configured by the memory management circuit 1043 are mapped to some of the physical addresses in the first partition 1061, and the host system 1000 can only access the first partition 1061.

In the present exemplary embodiment, if the memory management circuit 1043 determines that the binary code to be read or written by the host system 1000 matches the virus signature corresponding to the predetermined file segment, besides not writing the binary code into the memory storage device 100 and not transmitting it back to the host system 1000, the memory management circuit 1043 further issues a specific command to instruct the host system interface 1041 to disconnect from the data transmission interface 1110 (i.e., to switch the connector 102 and the host system 1000 into an uncoupled state) and then reconnect to the data transmission interface 1110 (i.e., to switch the connector 102 and the host system 1000 into a coupled state). In other words, the memory storage device 100 simulates a power shutdown operation (or a hot-plug operation), so as to make the host system 1000 to ask for the identification information of the memory storage device 100 again. In this case, the memory management circuit 1043 informs the host system 1000 that the second partition 1063 is a CD-ROM partition. Next, the OS of the host system 1000 automatically runs the auto-execute file in the second partition 1063, and the auto-execute file automatically executes the application program in the host system 1000 to perform a post-processing procedure. For example, in the post-processing procedure, a user interface is displayed on the display 1206 of the host system 1000 to display a warning message indicating that the current binary code is virus-infected or an inquiry message inquiring whether the user wants to continue to transmit the binary code. In another exemplary embodiment, a complete virus cleanup operation may also be executed in the post-processing procedure.

In an exemplary embodiment, after the memory management circuit 1043 receives an entering-suspend-mode signal from the host system 1000, since the memory management circuit 1043 is capable of analyzing the FAT, it analyzes the FAT to identify existing files stored in the rewritable non-volatile memory chip 106. Before receiving an exiting-suspend-mode signal from the host system 1000, the memory management circuit 1043 respectively compares the existing files with the virus signatures in the virus signature database to determine whether each of the existing files is virus-infected. In other words, the memory management circuit 1043 automatically starts to scan the existing files one by one for virus once the host system 1000 enters the suspend mode, and it stops the virus scanning operation when the host system 1000 exits the suspend mode. Herein if the memory management circuit 1043 determines that any existing file is infected by virus, it activates the light emitting device (for example, controls the light emitting device to flash) to inform the user that there are virus-infected files in the memory storage device 100.

In another exemplary embodiment of the invention, besides the predetermined virus signature database in the memory controller 104, when a virus signature updating command and a virus signature updating data are received, the memory management circuit 1043 writes the virus signature updating data into the virus signature database to update the content of the virus signature database.

In summary, in exemplary embodiments of the invention, because the memory controller is capable of analyzing the FAT, the memory controller can identify the file segment containing a binary code based on the FAT and compares the binary code with corresponding virus signatures in the virus signature database before it sends the binary code back to the host system or writes the binary code into the memory storage device in response to a read or write command issued by the host system. Thereby, the memory storage device itself can determine whether a binary code to be read or written by the host system is infected by virus. In addition, when the host system enters a suspend mode, the memory storage device scans existing files one by one for any virus. Moreover, the virus signature database in the memory storage device can be updated by simply issuing a specific virus signature updating command to the memory storage device. It should be noted that the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A virus scanning method, adapted to a memory storage device coupled to a host system, wherein the memory storage device comprises a rewritable non-volatile memory chip, the rewritable non-volatile memory chip has a plurality of physical blocks, and each of the physical blocks has a plurality of physical addresses, the virus scanning method comprising:
providing a virus signature database, wherein the virus signature database records at least one predetermined file segment and at least one virus signature corresponding to the at least one predetermined file segment;
configuring a plurality of logical addresses to be mapped to a part of the physical addresses, wherein the host system accesses the logical addresses by using a file system, and the file system comprises a file allocation table (FAT);
receiving at least one binary code, wherein the at least one binary code comprises a binary code to be written by the host system or a binary code to be read by the host system and corresponding to an excess address range;
analyzing the FAT to identify a file segment containing the at least one binary code;
identifying the file segment containing the at least one binary code in a logical address linked list;
determining whether the file segment matches any one of the at least one predetermined file segment;
when the file segment matches one of the at least one predetermined file segment, determining whether the at least one binary code matches any one of the at least one virus signature corresponding to the matched predetermined file segment; and
when the at least one binary code matches one of the at least one virus signature corresponding to the matched predetermined file segment, not writing the at least one binary code into the memory storage device or not transmitting the at least one binary code back to the host system.

2. The virus scanning method according to claim 1 further comprising:
when the file segment does not match the at least one predetermined file segment, splitting the file segment into a plurality of sub file segments matching the at least one predetermined file segment;
determining whether the at least one binary code corresponding to the sub file segments matches the at least one virus signature corresponding to the at least one predetermined file segment; and
when the at least one binary code corresponding to the sub file segments matches any one of the at least one virus signature corresponding to the at least one predetermined file segment, not writing the at least one binary code matching the at least one virus signature corresponding to the at least one predetermined file segment into the memory storage device, or not transmitting the at least one binary code matching the at least one virus signature corresponding to the at least one predetermined file segment back to the host system.

3. The virus scanning method according to claim 1 further comprising:
finding the logical address linked list corresponding to the file segment containing the at least one binary code from the FAT.

4. The virus scanning method according to claim 1, wherein the rewritable non-volatile memory chip is logically divided into a first partition and a second partition, the logical addresses are mapped to a part of the physical addresses in the first partition, and the second partition stores an auto-execute file and an application program, the virus scanning method further comprising:
making an operating system (OS) of the host system to automatically run the auto-execute file; and
automatically executing the application program through the auto-execute file to perform a post-processing procedure.

5. The virus scanning method according to claim 4, wherein the post-processing procedure comprises displaying a warning message to indicate that the at least one binary code is virus-infected, displaying an inquiry message to inquire whether to continue to transmit the at least one binary code, or executing a complete virus cleanup operation.

6. The virus scanning method according to claim 1 further comprising:
receiving an entering-suspend-mode signal from the host system;
analyzing the FAT to identify at least one existing file stored in the rewritable non-volatile memory chip; and
before receiving an exiting-suspend-mode signal from the host system, comparing the at least one existing file with the at least one virus signature recorded in the virus signature database to determine whether the at least one existing file is virus-infected.

7. The virus scanning method according to claim 6, wherein a light emitting device is disposed in the memory storage device, and the virus scanning method further comprises:
activating the light emitting device when the at least one binary code matches the at least one virus signature corresponding to the matched predetermined file segment or the at least one existing file is virus-infected.

8. The virus scanning method according to claim 1 further comprising:
receiving a virus signature updating command and a virus signature updating data; and
updating the virus signature database by using the virus signature updating data.

9. A memory controller, for managing a rewritable non-volatile memory chip in a memory storage device, the memory controller comprising:
a host system interface, configured to couple a host system;
a memory interface, configured to couple the rewritable non-volatile memory chip, wherein the rewritable non-volatile memory chip has a plurality of physical blocks, and each of the physical blocks has a plurality of physical addresses; and
a memory management circuit, coupled to the host system interface and the memory interface, for providing a virus signature database, wherein the virus signature database records at least one predetermined file segment and at least one virus signature corresponding to the at least one predetermined file segment,
wherein the memory management circuit further configures a plurality of logical addresses to be mapped to a part of the physical addresses, the host system accesses the logical addresses by using a file system, and the file system comprises a FAT,
wherein when the memory management circuit receives at least one binary code, the memory management circuit further analyzes the FAT to identify a file segment containing the at least one binary code and identifies the file segment containing the at least one binary code in a logical address linked list, wherein the at least one binary code comprises a binary code to be written by the host system or a binary code to be read by the host system and corresponding to an excess address range, the memory management circuit further determines whether the file segment matches any one of the at least one predetermined file segment, and when the file segment matches one of the at least one predetermined file segment, the memory management circuit determines whether the at least one binary code matches any one of the at least one virus signature corresponding to the matched predetermined file segment, when the at least one binary code matches one of the at least one virus signature corresponding to the matched predetermined file segment, the memory management circuit does not write the at least one binary code into the memory storage device or transmit the at least one binary code back to the host system.

10. The memory controller according to claim 9, wherein when the file segment does not match the at least one predetermined file segment, the memory management circuit splits the file segment into a plurality of sub file segments matching the at least one predetermined file segment and determines whether the at least one binary code corresponding to the sub file segments matches the at least one virus signature corresponding to the at least one predetermined file segment, when the memory management circuit determines that the at least one binary code corresponding to the sub file segments matches any one of the at least one virus signature corresponding to the at least one predetermined file segment, the memory management circuit does not writes the at least one binary code matching the at least one virus signature corresponding to the at least one predetermined file segment into the memory storage device or transmit the at least one binary code matching the at least one virus signature corresponding to the at least one predetermined file segment back to the host system.

11. The memory controller according to claim 9, wherein the memory management circuit further finds the logical address linked list corresponding to the file segment containing the at least one binary code from the FAT.

12. The memory controller according to claim 9, wherein the rewritable non-volatile memory chip is logically divided into a first partition and a second partition, the logical addresses are mapped to a part of the physical addresses in the first partition, and the second partition stores an auto-execute file and an application program, after the memory management circuit not writing the at least one binary code into the memory storage device or not transmitting the at least one binary code back to the host system, the memory management circuit makes an OS of the host system to automatically run the auto-execute file, and the auto-execute file automatically executes the application program to perform a post-processing procedure.

13. The memory controller according to claim 12, wherein the post-processing procedure comprises displaying a warning message to indicate that the at least one binary code is virus-infected, displaying an inquiry message to inquire whether to continue to transmit the at least one binary code, or executing a complete virus cleanup operation.

14. The memory controller according to claim 9, wherein after the memory management circuit receives an entering-suspend-mode signal from the host system, the memory management circuit further analyzes the FAT to identify at least one existing file stored in the rewritable non-volatile memory chip, before the memory management circuit receives an exiting-suspend-mode signal from the host system, the memory management circuit compares the at least one existing file with the at least one virus signature recorded in the virus signature database to determine whether the at least one existing file is virus-infected.

15. The memory controller according to claim 14, wherein a light emitting device is disposed in the memory storage device, and the memory management circuit further activates the light emitting device when the at least one binary code matches the at least one virus signature corresponding to the matched predetermined file segment or the at least one existing file is virus-infected.

16. The memory controller according to claim 9, wherein the memory management circuit further receives a virus signature updating command and a virus signature updating data and updates the virus signature database by using the virus signature updating data.

17. A memory storage device, comprising:
a rewritable non-volatile memory chip, having a plurality of physical blocks, wherein each of the physical blocks has a plurality of physical addresses;
a connector, configured to couple a host system; and
a memory controller, coupled to the rewritable non-volatile memory chip and the connector, for providing a virus signature database, wherein the virus signature database records at least one predetermined file segment and at least one virus signature corresponding to the at least one predetermined file segment, wherein the memory controller further configures a plurality of logical addresses to be mapped to a part of the physical addresses, wherein the host system accesses the logical addresses by using a file system, and the file system comprises a FAT, when the memory controller receives at least one binary code, the memory controller further analyzes the FAT to identify a file segment containing the at least one binary code and identifies the file segment containing the at least one binary code in a logical address linked list, wherein the at least one binary code comprises a binary code to be written by the host system or a binary code to be read by the host system and corresponding to an excess address range, the memory controller further determines whether the file segment matches any one of the at least one predetermined file segment, and when the file segment matches one of the at least one predetermined file segment, the memory controller determines whether the at least one binary code matches the virus signature corresponding to the matched predetermined file segment, when the at least one binary code matches one of the at least one virus signature corresponding to the matched predetermined file segment, the memory controller does not write the at least one binary code into the memory storage device or transmit the at least one binary code back to the host system.

18. The memory storage device according to claim 17, wherein when the file segment does not match the at least one predetermined file segment, the memory controller splits the file segment into a plurality of sub file segments matching the at least one predetermined file segment and determines whether the at least one binary code corresponding to the sub file segments matches the at least one virus signature corresponding to the at least one predetermined file segment, when the memory controller determines that the at least one binary code corresponding to the sub file segments matches any one of the at least one virus signature corresponding to the at least one predetermined file segment, the memory controller does not write the at least one binary code matching the at least one virus signature corresponding to the at least one predetermined file segment into the memory storage device or transmit the at least one binary code matching the at least one virus signature corresponding to the at least one predetermined file segment back to the host system.

19. The memory storage device according to claim 17, wherein the memory controller further finds the logical address linked list corresponding to the file segment containing the at least one binary code from the FAT.

20. The memory storage device according to claim 17, wherein the rewritable non-volatile memory chip is logically divided into a first partition and a second partition, the logical addresses are mapped to a part of the physical addresses in the first partition, and the second partition stores an auto-execute file and an application program, after the memory controller not writing the at least one binary code into the memory storage device or not transmitting the at least one binary code back to the host system, the memory controller makes an OS of the host system to automatically run the auto-execute file, and the auto-execute file automatically executes the application program to perform a post-processing procedure.

21. The memory storage device according to claim 20, wherein the post-processing procedure comprises displaying a warning message to indicate that the at least one binary code is virus-infected, displaying an inquiry message to inquire whether to continue to transmit the at least one binary code, or executing a complete virus cleanup operation.

22. The memory storage device according to claim 17, wherein after the memory controller receives an entering-suspend-mode signal from the host system, the memory controller further analyzes the FAT to identify at least one existing file stored in the rewritable non-volatile memory chip, before the memory controller receives an exiting-suspend-mode signal from the host system, the memory controller compares the at least one existing file with the at least one virus signature recorded in the virus signature database to determine whether the at least one existing file is virus-infected.

23. The memory storage device according to claim 22, wherein a light emitting device is disposed in the memory storage device, and the memory controller further activates the light emitting device when the at least one binary code matches the at least one virus signature corresponding to the matched predetermined file segment or the at least one existing file is virus-infected.

24. The memory storage device according to claim 17, wherein the memory controller further receives a virus signature updating command and a virus signature updating data and updates the virus signature database by using the virus signature updating data.

* * * * *